United States Patent [19]
Hiscox et al.

[11] Patent Number: 5,102,426
[45] Date of Patent: Apr. 7, 1992

[54] PROCESS FOR PRECIPITATING ALUMINA FROM BAYER PROCESS LIQUOR

[75] Inventors: Bryan A. Hiscox; Charles D. Ellis, Dollard; Jacques E. Larocque; Denis R. Audet, both of Jonquiere, all of Canada

[73] Assignee: Alcan International Limited, Montreal, Canada

[21] Appl. No.: 480,059

[22] Filed: Feb. 14, 1990

[51] Int. Cl.$^5$ .............................................. B01D 9/02
[52] U.S. Cl. .................. 423/301; 23/305 A; 423/121; 423/127; 423/629
[58] Field of Search ............... 423/121, 123, 124, 127, 423/625, 629; 23/301, 305 A

[56] References Cited

U.S. PATENT DOCUMENTS

| | | | |
|---|---|---|---|
| 2,707,669 | 5/1955 | Houston et al. | 423/124 |
| 3,486,850 | 12/1969 | Day | 423/127 |
| 3,649,184 | 3/1972 | Featherson | 423/629 |
| 4,234,559 | 11/1980 | Tschamper | 423/629 |
| 4,305,913 | 12/1981 | Anjier | 423/123 |
| 4,311,486 | 1/1982 | Yamada | 423/629 |
| 4,512,959 | 4/1985 | Pohland et al. | 423/121 |
| 4,614,642 | 9/1986 | Cristol et al. | 423/121 |
| 4,617,179 | 10/1986 | Veyrier | 423/121 |

FOREIGN PATENT DOCUMENTS

| | | | |
|---|---|---|---|
| 3219288 | 6/1983 | Fed. Rep. of Germany | 423/629 |
| 49-004696 | 1/1974 | Japan | 423/629 |
| 55-051720 | 4/1980 | Japan | 423/629 |

OTHER PUBLICATIONS

Sang, J. V., "Factors Affecting the Attrition Strength of Alumina Products", 1987 Light Metals, The Metallurgical Societ/AIME (Warrendale, Pa.), pp. 121-127 (Exhibit 7).

Primary Examiner—Michael Lewis
Assistant Examiner—Ncog-Yen M. Ngoc
Attorney, Agent, or Firm—Cooper & Dunham

[57] ABSTRACT

An improved process for precipitating alumina from Bayer process liquors is disclosed. The process involves dividing an incoming pregnant liquor stream into a minor portion of about 10 to about 25% of the total incoming pregnant liquor stream, and directing that stream into a series of small tanks where the minor stream is permitted to agglomerate. Fine aluminum hydroxide seed having a median particle size of between about 30 and about 60 microns is added to this stream. The slurry resulting from the agglomeration stage is then directed to a set of larger vessels in which the growth stage will take place. At this point, the remaining portion of the pregnant liquor is combined with the slurry resulting from the agglomeration stage. A coarse seed charge of about 150 to about 600 grams/liter of seed having a median particle size of between about 80 and about 100 microns is charged into the second set of vessels. This improved process helps to increase the yield of a strong coarse aluminum trihydroxide product.

18 Claims, 1 Drawing Sheet

PROCESS FOR PRECIPITATING ALUMINA FROM BAYER PROCESS LIQUOR

BACKGROUND OF THE INVENTION

1. Field of the Invention

This invention relates to a process for precipitating aluminum trihydroxide from Bayer process liquors, and more particularly to improvements in the Bayer process which help to increase the yield of alumina and the size of alumina particles retrieved from Bayer process liquors.

2. Description of the Prior Art

Various attempts have been made to increase the yield and particle size of the alumina recovered from Bayer process liquors in the more than 100 years since the invention of the Bayer process.

Recent attempts at improvements have included modifying various aspects of the process including dividing the incoming pregnant liquor stream into more than one part and supplying one part to a series of tanks known as the agglomeration section, and the remainder of the stream to a second series of tanks known as the growth section.

For example, a process described in U.S. Pat. No. 4,311,486 (Yamada) divides the incoming flow into two portions, and adds from 30 to 150 grams/liter of seed having a particle size of less than 10 microns to the agglomeration section, and from 30 to 150 grams/liter of coarse seed wherein at least 10% by weight of grains passing through a 325-mesh Tyler sieve is used in the growth section.

Another approach, contained in U.S. Pat. No. 4,614,642 (Cristol), also involves dividing the incoming pregnant liquor into two parts. According to that patent, 700 grams/liter of ungraded seed should be added to the agglomeration stage, and no seed should be added to the growth stage of the process.

Still other efforts have been made to improve yield and particle size in the Bayer process. U.S. Pat. No. 4,305,913 (Anjier), U.S. Pat. No. 4,234,559 (Tschamper), and U.S. Pat. No. 4,617,179 (Veyrier), each disclose attempts to solve the foregoing problems based upon adjustments to the various steps in the Bayer process.

None of the foregoing techniques, however, has been entirely successful in increasing yield and particle size of the alumina recovered from the Bayer process liquors.

SUMMARY OF THE INVENTION

It is a principal object of the invention to obtain high yields of alumina of large particle size from Bayer process liquor.

To this and other ends, the invention broadly contemplates the provision of improvements in a process for precipitating aluminum trihydroxide from Bayer process pregnant liquor including the steps of dividing an incoming stream of the pregnant liquor into a major portion and a minor portion; adding to only the minor portion a first particle size fraction of aluminum trihydroxide particles as seed for inducing precipitation of aluminum trihydroxide; passing only the minor portion, containing the first seed fraction, through a first reaction circuit comprising at least one vessel under conditions for inducing precipitation and agglomeration of aluminum trihydroxide particles from the liquor, the particles thus precipitated and agglomerated being carried from the first circuit in the minor portion of the stream; beyond the first circuit, reuniting the minor portion with the major portion to provide a recombined stream; adding to the recombined stream a second particle size fraction of aluminum trihydroxide particles as seed for inducing precipitation of aluminum trihydroxide, the second seed fraction being larger than the first seed fraction in median particle size; and passing the recombined stream, containing the second seed fraction, through a second reaction circuit comprising at least one vessel under conditions for inducing precipitation and growth of aluminum trihydroxide particles from the liquor, the particles thus precipitated and grown being carried from the second circuit in the recombined stream.

More particularly, in accordance with the invention, in a first aspect thereof, the aforementioned minor portion of the incoming stream is not more than about 25% by volume of the total incoming stream.

In a further important aspect, the process involves providing a reaction circuit having a first series of vessels for carrying out the agglomeration stage and a second series or set of vessels for carrying out the growth stage of precipitation of alumina from Bayer process liquors. An incoming stream of pregnant liquor is divided into major and minor portions. The minor portion, which may comprise between about 10% and 25% of the flow, is fed into the first series of tanks, and charged with a fine alumina seed. Preferably, the minor portion of the stream is charged with about 20 to about 110 grams/liter of fine seed having a median particle diameter of between about 30 to about 60 microns. The agglomeration phase of the precipitation process is preferably carried out in a short chain of small tanks to maintain a short residence time, from about 4 to about 12 hours. These are homogeneous tanks (with no solids accumulation in the vessels) and the slurry discharged to the growth section.

The remaining portion of the pregnant liquor is added to the second set of vessels in the system, called the growth section, together with a coarse seed charge of between 150–600 grams/liter, with the coarse seed having a median size of 80 to 100 microns. This charge of seed may be added directly, preferably as filtered moist hydrate to avoid the recirculation and the dilution effects of large spent liquor volume, or it may be provided by initially adding a small charge of seed, with the aluminum trihydroxide charge accumulated in the larger tanks by differential transfer of liquor and trihydroxide.

The major portion of liquor fed into the growth section of the series of vessels may be cooled, if necessary, to achieve a temperature of 50° to 70° C. (typically 55°–60° C.) in the first vessel. The process continues in the chain of vessels for a normal residence time of 35 to 60 hours. Precipitation can be optimized by controlling the temperature in each vessel such that the temperature at the end of the vessel chain is 55° C. or less.

In yet other embodiments of the invention, two incoming streams of pregnant liquor are respectively treated in two parallel precipitation chains, in each of which the incoming stream is divided into a major portion and a minor portion for initial generation or agglomeration of precipitated hydroxide particles only in the minor portion, i.e. in a first reaction circuit, with recombination of the major and minor portions in a second or growth reaction circuit, and recycling of produced particles from one chain to the other for use as seed so that the particles are exposed to fresh pregnant liquor several times after the initial agglomeration stage.

Further features and advantages of the invention will become evident upon consideration of the following detailed description in conjunction with the attached drawing.

DETAILED DESCRIPTION OF THE PREFERRED EMBODIMENT

Figure 1:
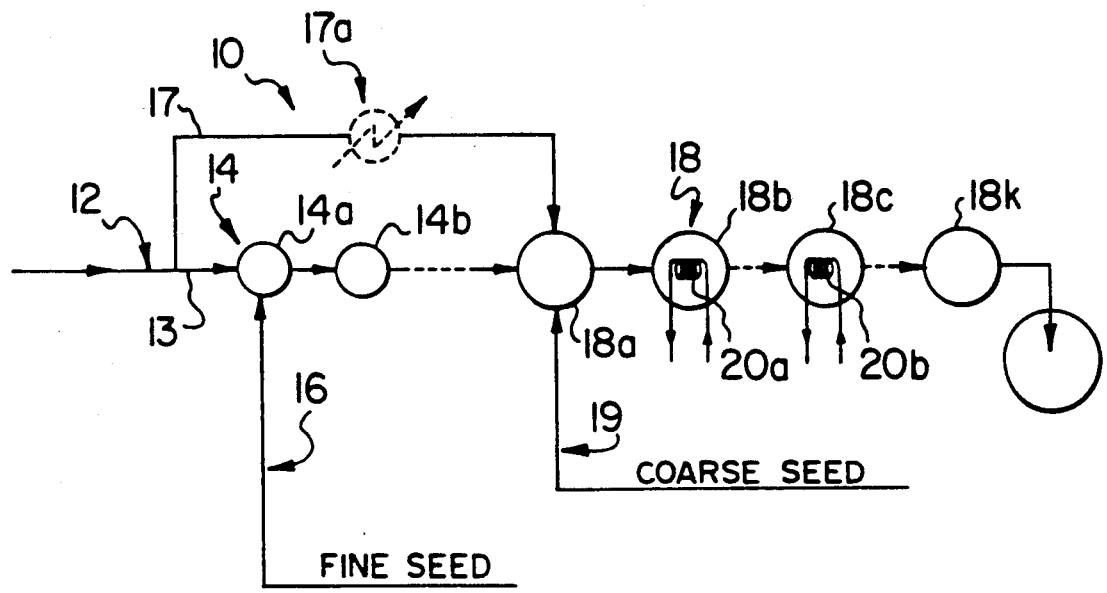
FIG. 1 is a schematic drawing of an illustrative embodiment of the process of this invention.

The basic principles of the Bayer process for removing alumina from bauxite ore have not changed in the more than 100 years which have elapsed since the original patent was granted. The Bayer process takes advantage of the reaction of the trihydrate and/or monohydrate of alumina contained in bauxite ore with aqueous caustic soda to form sodium aluminate. In a typical example of the Bayer process the following operations are performed in turn: (1) dissolution of the alumina at a high temperature; (2) separation and washing of insoluble impurities of bauxite (red muds) to recover the soluble alumina and caustic soda; (3) partial hydrolysis of sodium aluminate at a lower temperature to precipitate aluminum trihydroxide; (4) regeneration of the solutions for reuse by evaporation of the water introduced by the washing; and (5) calcination of the aluminum trihydroxide to anhydrous alumina.

For the purposes of this application, the term "Attrition Index" means a measure of the friability of alumina as determined by the industry standard Forsythe-Hertwig Attrition Test, described in *Ind. & Eng. Chem.*, Volume 41, page 1200.

The term "pregnant liquor" means a highly supersaturated solution of alumina and other impurities dissolved in sodium hydroxide. It has been filtered to remove solid inerts and impurities.

The term "caustic concentration" means the concentration of total sodium hydroxide in the solution in grams/liter, expressed as equivalent $Na_2CO_3$.

The term "fine seed" means aluminum trihydroxide crystals, typically $45\mu$ in diameter, which serve for the agglomeration section, upon which the dissolved alumina can precipitate.

The term "ratio" is the ratio of dissolved alumina expressed as g/L $Al_2O_2$: total caustic as g/L NaOH, but expressed in equivalent g/L $Na_2CO_3$.

The term % causticity =

$$\frac{\text{(Conc'n of Total Caustic, expressed as equiv. } Na_2CO_3)}{\text{(Conc'n of Total Caustic + Conc'n of Sodium Carbonate)}} \times 100$$

A "draft tube agitator" is used to mix the contents of the precipitator tanks to prevent the solids from settling to the bottom. A draft tube agitator includes a large axial flow pump located at the top of a hollow column, called the "draft tube". The column is located in the center of the cylindrical tank and submerged below the liquid surface. The axial flow pump forces liquid down the draft tube, so that it impinges on the bottom of the tank and is forced upward in the annular space between the exterior wall of the tank and the draft tube to return to the pump after a cycle at 3-5 minutes. Such circulation will maintain a substantially uniform concentration of solids in the tank below the level of the top of the draft tube. Of course, other means of agitation to maintain a uniform concentration of solids may be used.

Preparatory to the digestion process, the bauxite may be dried and ground. Fine grinding helps ensure efficient extraction of the alumina. The drying ordinarily removes free water in the bauxite ore but leaves the water of hydration.

The digestion of bauxite with sodium hydroxide aims to dissolve as much as possible of the alumina, either as the monohydrate (boehmite) or trihydrate (gibbsite) in the shortest possible time and to produce a solution from which a maximum amount of alumina can be precipitated per unit volume. Digestions are usually performed in steel autoclaves or in tubular reactors. Heat exchangers recover much of the heat content of liquor leaving the reactor to heat liquor entering it.

The insoluble residues remaining after digestion are commonly known as red mud. They include iron oxides, sodium aluminum silicate, titanium oxide and other metal oxide impurities. The red muds may have a very fine particle size, making them difficult to separate and wash. These operations are usually accomplished by continuous countercurrent decantation with the dilute wash liquors being combined with the more concentrated pregnant liquors. After decantation, the pregnant liquors are normally submitted to a polishing filtration.

Once filtration is complete and the last traces of insoluble mud have been removed, the filtered liquors are cooled in preparation for precipitating their alumina content. To induce precipitation, aluminate liquor is seeded with seed obtained from previously precipitated crystals, and the mixture is agitated. The seed grows to an acceptable size and is then separated from the liquor.

The spent aluminate solution diluted by the water used to wash the mud prior to precipitation is reconcentrated in evaporation equipment. The aluminum trihydroxide from precipitation is filtered and washed, and the alumina is now ready to undergo calcination. Calcination changes the composition and crystalline structure of the alumina without changing particle shape.

European and American plants employ slightly different variations of the Bayer process. European plants use much higher caustic concentrations for digestion of bauxite ore. This more concentrated liquor requires less energy per unit volume of liquor circulated.

In the American process, use of a more dilute caustic solution results in production of larger particles, although at a somewhat lower yield.

The Bayer process as practiced in Europe and the United States has evolved over the years to satisfy the demands made by the continuous and ongoing development of the process. These demands now include:

1. High yield from the process liquor, to minimize the energy requirements of the process, and to maximize the production rate from existing facilities. In practice this implies precipitation from a caustic solution having a caustic concentration higher than previously considered normal for North American Bayer circuits—typically 150-200 gpl NaOH caustic expressed as $Na_2CO_3$—now 200-300 gpl.

2. Production of a coarse granular product, to minimize dusting and facilitate handling in subsequent phases of metal production—typically less than 10%–44 micron.
3. Production of a crystal with a morphology which is resistant to breakdown during and after rough treatment in modern fluid flash calciners. Typically a breakdown of less than 4%–44 micron during calcination, and an Attrition Index of less than 20 after calcination, are required.
4. Production of a material with a low total soda content, to match the low losses from modern dry-scrubbed long-life cells in the smelters, and to avoid excess bath generation. Typically, values of less than 0.40% $Na_2O$ (calcined basis) are now required.

To satisfy the foregoing demands, a precipitation circuit has been developed which is applicable principally but not exclusively to continuous precipitation circuits. The process of the present invention will now be explained with reference to the drawing.

FIG. 1 depicts schematically an example of a precipitation circuit for use in recovery of aluminum trihydroxide from Bayer process liquors generally designated with the reference numeral 10 for use in the process of the present invention. As schematically shown in FIG. 1, pregnant liquor is supplied through pipeline 12 to the precipitation circuit 10. The precipitation circuit 10 preferably includes a chain of up to 20, preferably 10–15 tanks or vessels, also called precipitators. The tanks include two sizes. Preferably 2–4 smaller tanks each of approximately 1100 m$^3$ capacity to provide a residence time of 2 hours comprise the agglomeration stage of the precipitation circuit 10; the remaining tanks, comprising the growth stage, may each have a capacity of 4400 or more, to provide a residence time of 4 hours. All these tanks or vessels are preferably provided with draft tube agitators (not shown), of generally conventional character and as such requiring no further description, to effect the requisite agitation of the liquor during the precipitation operation. The larger (growth stage) tanks may be fitted with weirs (not shown) to skim liquor from the top surface of the contents of the tank and cooling devices to remove heat from the contents.

The incoming pregnant liquor preferably has a temperature of between about 70° and about 85° C., with the typical temperature being about 75° C. The pregnant liquor usually and preferably has a concentration of about 150 grams/liter to about 300 grams/liter of total caustic and a ratio of about 0.6 through about 0.75 of dissolved alumina to total caustic. If, as is preferred, the concentration of caustic in the incoming pregnant liquor is about 250 grams/liter, the preferred ratio of the dissolved alumina to total caustic is about 0.70. Cooling of the incoming pregnant liquor may be accomplished in the plant heat exchange network prior to its admission to the precipitation section.

As the pregnant liquor approaches the precipitation or reaction circuit 10, a minor portion of the flow is directed through a pipeline 13 into a first series 14 of vessels 14a, 14b, etc., in which the agglomeration stage of the reaction takes place. Preferably, the minor portion comprises about 10 to about 25% of the total incoming pregnant liquor flow, typically 15 to 20%. The first (agglomeration stage) series 14 of vessels preferably should be a short chain of small tanks to maintain small residence time and hence high ratios. These tanks are homogeneous with no solids accumulation in the vessels, and the slurry is transferred from one tank to the succeeding tank in the chain.

The minor portion of the pregnant liquor introduced into the first series 14 of vessels is charged with fine seed of aluminum hydroxide crystals through pipeline 16. Preferably, about 20 to about 100 grams/liter of fine seed is added to this portion of the pregnant liquor. The fine seed should preferably have a median size of about 35 to about 50 microns, with 45 microns preferred. The minor portion of the flow is allowed to reside in the agglomeration section of the circuit for about 4 to 12 hours, with a typical residence time being 6 hours.

The remaining (major) portion of the pregnant liquor, which constitutes from about 75 to about 90% of the incoming pregnant liquor stream, is delivered through a pipeline 17 (bypassing the first series 14 of vessels) directly to the second (growth stage) series 18 of vessels 18a, 18b, 18c . . . 18k, which serve as containers for the growth stage of the process. The liquor thus fed to the second series 18 of vessels may be cooled as necessary (for example by optional cooling means schematically indicated as 17a, ahead of the first tank 18a). The minor portion of the liquor, after passing through the first series 14 of vessels, is also delivered by means shown as pipeline 17b) to the first vessel 18a of the second series 18, where it rejoins the major portion of the liquor.

In the vessel 18a, as shown (or in the next successive vessel 18b), the liquor is charged through pipeline 19 with coarse seed having a median size of about 80 to about 100 microns, preferably 90 microns. The coarse seed charge should be between about 150 to about 600 grams/liter, preferably 400 grams/liter. The coarse seed charge may be added directly, as filtered moist hydrate, to avoid the recirculation and ratio dilution effects of a large volume of spent liquor. Alternatively, only a small charge of seed may be thus added, and the hydrate charge may be accumulated in the tanks by differential transfer of liquor and hydrate, as further described below.

For such differential transfer, the vessels of the second series 18 may be provided with weirs (not shown) or other means, such as by varying the ratio of underflow to overflow to retain aluminum trihydroxide solids, so that this concentration increases to e.g. 400 g/L. The weirs effect preferential retention of the larger trihydroxide particulates, while fines are entrained in the liquor passing from vessel to vessel of the series 18. Thus, in the vessel series 18, the fine material will be selectively advanced through the circuit 10 with the liquor streams, and thereby will advance quickly to the classification system, where as is conventional) the fines are separated, being returned as seed through line 16 back to the agglomeration section of the process. This selective rapid circulation of fine particles favors the production of a coarse strong product in the circuit.

As shown schematically in FIG. 1, the treatment in vessel series 18 continues in a chain of vessels, to give nominal residence time for the feed flow in the second series 18 of tanks of about 30 to 60 hours. The precipitation rate is optimized in each vessel in the second series 18 by continuously cooling the slurry in a number of vessels to achieve an end of chain temperature of 50° C. or less. Preferably, the coolant in the earlier vessels of the second series 18 should be spent process liquor to conserve energy in the process. In subsequent tanks, the coolant can be cold water. That is to say, in the upstream vessels of series 18, cooling is effected by heat exchange between the liquor in the vessels and spent Bayer process liquor (which requires reheating for recirculation to the Bayer process extraction stage), while in the later or downstream vessels of series 18 cooling is effected by heat exchange between the liquor in the vessels and cold water. For convenience, this heat exchange arrangement is represented in the drawing by coils 20a (through which spent process liquor passes) and 20b (through which cold water passes).

The degree of cooling in each vessel of series 18 will be determined by the conditions of that particular system, and may depend on such factors as the natural heat loss to the environment. Any appropriate cooling device may be used.

After this precipitation process the slurry is fractionated into product, coarse seed, fine seed and spent liquor streams using any of the established techniques known to those of ordinary skill working in the aluminum industry, such as gravity sedimentation, elutriation, centrifugal separation by hydroclones, screening and sieving.

Figure 2:
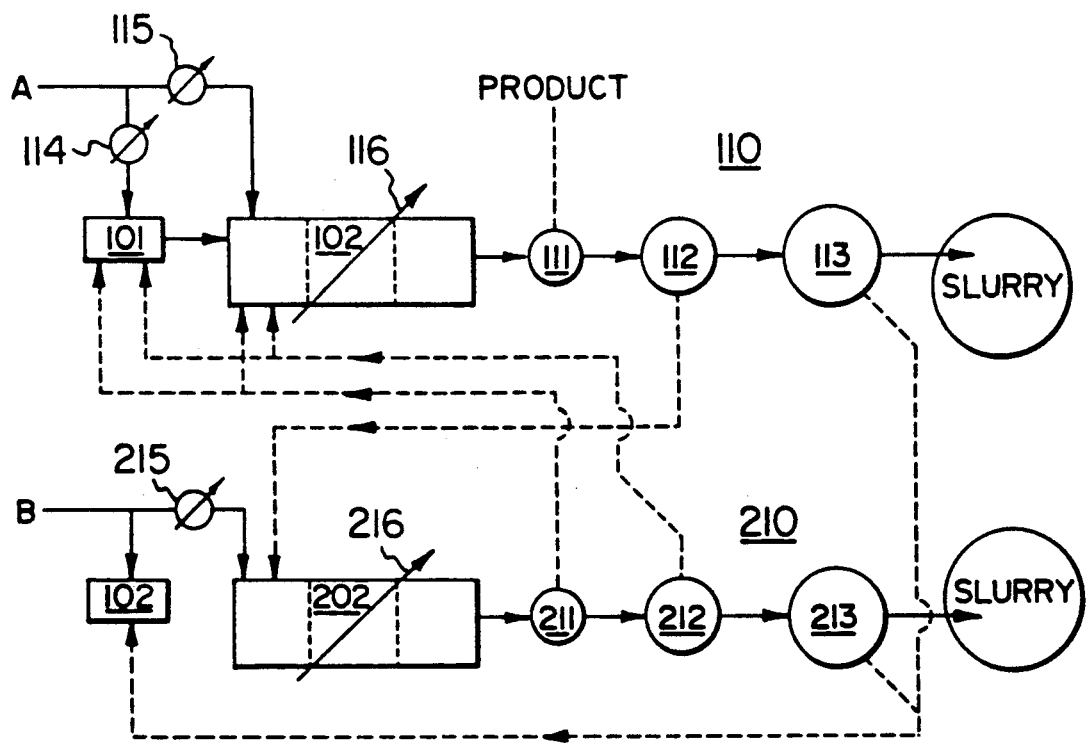
FIG. 2 is a schematic drawing of a further embodiment of the process of this invention.

In another embodiment of the invention, shown in FIG. 2, there are two parallel precipitation chains A and B, similar to those of the first embodiment shown in FIG. 1, and comprising for chain A a seed generation section 101, followed by a growth section 102, and at the end of the growth section a fractionation section 110 consisting of three separate stages to fractionate the product slurry into particles with different size ranges by means of primary 111, secondary 112 and tertiary 113 fractionators or classifiers. These classifiers produce respectively coarse particles, intermediate size particles and fine particles. For chain B, the agglomeration section is designated 201, the growth section 202, and the classification section 210; section 210 comprises the primary 211, secondary 212 and tertiary 213 classifiers, which fulfil the same classification functions as those on chain A.

A separate stream of fresh pregnant liquor is delivered to each of chains A and B (from the left-hand side of FIG. 2). The stream delivered to chain A is divided into a minor portion, which passes through generation section 101 to growth section 102, and a major portion, which advances directly to growth section 102 without passing through section 101. Similarly, in chain B, the major portion of the entering pregnant liquor stream advances directly to the growth section 202 while a minor portion is diverted through agglomeration section 201 before rejoining the major portion in section 202. Cooling (by suitable means, such as heat exchangers) is provided at the locations indicated by symbols 114, 115 and 116 is chain A and 215 and 216 in chain B.

This arrangement of the invention is designed to produce particles which are larger and stronger than those which can be produced in the single chain precipitation. This is achieved by exposing the particles to fresh pregnant liquor several times after the initial agglomeration stage, to deposit successive layers of hydrate on the original agglomerated nucleus.

FIG. 2 illustrates this process. The smallest particles separated in the tertiary classifiers 113 and 213 of both chain A and chain B are sent to the agglomeration section 201 of chain B, where they act as fine seed. In contrast, the seed for the generation section 101 of chain A is taken from the primary 211 or secondary 212 classifiers of chain B and the remainder of the product from these classifiers is used as seed for the growth section 102 of chain A. By judicious control of the seed charge and temperature profile in the A chain generation section 101, it is possible to generate sufficient new fine particles to maintain the population balance of the circuit as a whole. The product of the primary classifier 111 of chain A, on the other hand, having been subjected to at least two cycles of growth after the initial agglomeration, first in chain B and then in chain A, has achieved a satisfactory size and strength and exits from the precipitation process as product. Finally, to close the system, the product from the secondary classifiers 112 of chain A, which is smaller than the desired product, is returned to chain B as seed for the growth section 202 of chain B. This material will then experience at least two further cycles of growth before reaching the product primary classifier 111 of chain A.

The following examples, which are provided to illustrate the invention, are given to further facilitate the understanding of the operation of present precipitation system, and are not intended to be limiting. They are examples based on mathematical models, and are not examples of actual operation.

EXAMPLE

For continuity and ease of comparison these results have been generated by a mathematical model of the process which has been previously validated against plant and laboratory results. In all cases the process liquor is at 85% causticity, and contains 6.5 g/l organic carbon, 3.0 g/l sodium oxalate, 1.2 g/l sodium sulphate, and 3.8 g/l sodium chloride as well as other impurities. Ambient temperature is set at 10° C. The seed charges are constant, at 35 g/l fine seed (surface area 0.068 $m^2/g$) to the first precipitator, and 200 g/l coarse seed (surface area 0.032 $m^2/g$) to the fourth precipitator. The circuit includes fifteen mechanically agitated precipitation tanks in series all assumed to be in service, followed by a conventional primary-secondary-tertiary classification system. The first three precipitators are of 1100 $m^2$ volume, and the remaining twelve are 4400 $m^3$. In all cases the filtrate flow is 900 $m^3$/hour. 150 $m^3$/hour is delivered to the first precipitator at 81° C., and the remainder is delivered to the fourth tank at 60° C.

Two tables, each showing three variations, have been generated. Table 1 uses filling liquor at 200 g/l caustic and 0.63 alumina to caustic as carbonate ratio. Table 2 uses filling liquor at 250 g/l caustic and 0.70 ratio. Within each table there are three cases, labelled A, B and C.

Case A is a model of the process in accordance with the present invention schematically depicted in FIG. 1 and described herein.

Case B is a model of the process described in Case A, which has physical baffles installed in tanks 5 to 15 in the growth section to retain the solids in these tanks to increase their aluminum trihydroxide concentration to 400 g/l, thereby increasing the strength, and improving the attrition index.

Case C is the same model as case B, with additional in-tank cooling applied to follow an optimum temperature policy.

For each case the in-tank caustic concentration temperature and ratio are reported, together with the soda content ($Na_2O$) of the alumina produced by the hydrate precipitated in that tank.

TABLE 1

Filling Liquor: 200 g/l caustic, 0.63 ratio
17% to Tank 1 at 81° C., 83% to Tank 4 at 60° C.
Fine Seed: 35 g/l to Tank 1 at 0.068 m²/g
Coarse Seed: 200 g/l to Tank 4 at 0.032 m²/g

| | A | | | | B | | | | C | | | |
|---|---|---|---|---|---|---|---|---|---|---|---|---|
| | g/l Caustic | Temp °C. | Ratio | % Na₂O | g/l Caustic | Temp °C. | Ratio | % Na₂O | g/l Caustic | Temp °C. | Ratio | % Na₂O |
| 1 | 203 | 77.7 | .537 | .38 | 203 | 77.7 | .536 | .36 | 204 | 76.5 | .534 | .34 |
| 2 | 205 | 76.7 | .499 | .35 | 205 | 76.7 | .499 | .33 | 205 | 74.5 | .494 | .32 |
| 3 | 206 | 75.6 | .476 | .43 | 206 | 75.6 | .476 | .39 | 206 | 72.1 | .468 | .34 |
| 4 | 206 | 61.3 | .478 | .44 | 206 | 61.4 | .478 | .40 | 206 | 61.5 | .477 | .35 |
| 5 | 207 | 61.4 | .446 | .44 | 208 | 61.6 | .434 | .40 | 208 | 62.2 | .434 | .35 |
| 6 | 208 | 61.4 | .424 | .44 | 209 | 61.6 | .408 | .40 | 209 | 61.5 | .408 | .35 |
| 7 | 208 | 61.3 | .407 | .43 | 209 | 61.6 | .390 | .39 | 210 | 60.2 | .389 | .35 |
| 8 | 209 | 61.2 | .395 | .43 | 210 | 61.5 | .378 | .39 | 210 | 58.8 | .375 | .35 |
| 9 | 209 | 61.1 | .385 | .43 | 210 | 61.4 | .368 | .39 | 211 | 57.3 | .364 | .34 |
| 10 | 210 | 60.9 | .377 | .43 | 210 | 61.2 | .360 | .39 | 211 | 55.9 | .354 | .34 |
| 11 | 210 | 60.8 | .370 | .42 | 211 | 61.0 | .354 | .38 | 211 | 54.5 | .346 | .34 |
| 12 | 210 | 60.6 | .364 | .42 | 211 | 60.9 | .349 | .38 | 212 | 53.3 | .338 | .34 |
| 13 | 210 | 60.4 | .359 | .42 | 211 | 60.7 | .344 | .38 | 212 | 52.1 | .332 | .34 |
| 14 | 211 | 60.3 | .354 | .42 | 211 | 60.5 | .340 | .38 | 212 | 51.1 | .326 | .34 |
| 15 | 211 | 60.1 | .350 | .42 | 211 | 60.3 | .337 | .38 | 212 | 50.1 | .320 | .34 |

TABLE 2

Filling Liquor: 250 g/l caustic, 0.70 ratio
17% to Tank 1 at 81° C., 83% to Tank 4 at 60° C.
Fine Seed: 35 g/l to Tank 1 at 0.068 m²/g
Coarse Seed: 200 g/l to Tank 4 at 0.032 m²/g

| | A | | | | B | | | | C | | | |
|---|---|---|---|---|---|---|---|---|---|---|---|---|
| | g/l Caustic | Temp °C. | Ratio | % Na₂O | g/l Caustic | Temp °C. | Ratio | % Na₂O | g/l Caustic | Temp °C. | Ratio | % Na₂O |
| 1 | 256 | 78.7 | .590 | .39 | 256 | 78.7 | .590 | .38 | 257 | 76.8 | .585 | .38 |
| 2 | 259 | 77.8 | .550 | .36 | 259 | 77.8 | .550 | .34 | 260 | 74.2 | .540 | .35 |
| 3 | 260 | 76.7 | .527 | .47 | 260 | 76.7 | .527 | .44 | 261 | 71.4 | .511 | .40 |
| 4 | 260 | 62.1 | .533 | .50 | 261 | 62.2 | .533 | .47 | 261 | 61.3 | .531 | .43 |
| 5 | 263 | 62.3 | .496 | .49 | 264 | 62.5 | .485 | .46 | 264 | 61.8 | .483 | .43 |
| 6 | 264 | 62.3 | .471 | .49 | 265 | 62.6 | .458 | .45 | 266 | 60.9 | .455 | .43 |
| 7 | 265 | 62.3 | .454 | .48 | 266 | 62.6 | .440 | .45 | 267 | 59.6 | .436 | .42 |
| 8 | 266 | 62.2 | .441 | .48 | 267 | 62.5 | .427 | .44 | 268 | 58.0 | .421 | .42 |
| 9 | 267 | 62.1 | .431 | .47 | 268 | 62.4 | .418 | .44 | 269 | 56.5 | .409 | .41 |
| 10 | 267 | 61.9 | .423 | .47 | 268 | 62.2 | .410 | .43 | 269 | 55.1 | .399 | .41 |
| 11 | 268 | 61.8 | .416 | .47 | 269 | 62.1 | .404 | .43 | 270 | 53.7 | .390 | .41 |
| 12 | 268 | 61.6 | .410 | .46 | 269 | 61.9 | .399 | .43 | 271 | 52.4 | .382 | .41 |
| 13 | 268 | 61.4 | .405 | .46 | 269 | 61.7 | .394 | .43 | 271 | 51.3 | .375 | .41 |
| 14 | 269 | 61.3 | .400 | .46 | 270 | 61.6 | .390 | .42 | 271 | 50.2 | .368 | .40 |
| 15 | 269 | 61.1 | .396 | .46 | 270 | 61.4 | .387 | .42 | 272 | 49.3 | .363 | .40 |

The results contained in the tables demonstrate:

1. From Table 3, that at caustic concentration of 200 g/l the productivity is between 56 and 62 g/l alumina; when the caustic concentration is increased to 250 g/L, productivity is between 76 and 84 g/L. These productivities are significantly higher than those obtained in the traditional American process.

2. Table 3 shows that the productivity is improved by increasing the residence time of the hydrate in the precipitators (Case B) to give a hydrate concentration of 400 g/L; and, applying additional cooling (Case C) so that the temperature of the liquor in tank 15 is reduced to around 50° C.

3. Tables 1 and 2 show that the final product contains less than 0.50% Na₂O, and Table 2C shows that in this particular case, the product averages about 0.40% Na₂O.

The overall result can be summarized by Table 3.

TABLE 3

| CAUSTIC | PRODUCTIVITY g/l | | |
|---|---|---|---|
| g/l | A | B | C |
| 200 | 56.0 | 58.6 | 62.0 |
| 250 | 76.0 | 78.3 | 84.3 |

We claim:

1. In a process for precipitating aluminum trihydroxide from Bayer process pregnant liquor, the steps of
   (a) dividing an incoming stream of the pregnant liquor into a major portion and a minor portion, said minor portion being not more than 25% by volume of said incoming stream;
   (b) adding to only said minor portion a first particle size fraction of aluminum trihydroxide particles as seed for inducing precipitation of aluminum trihydroxide said first particle size fraction having a median particle size of between about 30 and about 60 microns;
   (c) passing only said minor portion, containing said first seed fraction, through a first reaction circuit comprising at least one vessel under conditions for inducing precipitation and agglomeration of aluminum trihydroxide particles from the liquor, the particles thus precipitated and agglomerated being carried from the first circuit in said minor portion of the stream;

(d) beyond said first circuit, reuniting said minor portion with said major portion to provide a recombined stream;

(e) adding to said recombined stream a second particle size fraction of aluminum trihydroxide particles as seed for inducing precipitation of aluminum trihydroxide, said second seed fraction being larger than said first seed fraction in median particle size; and (f) passing the recombined stream, containing said second seed fraction, through a second reaction circuit comprising at least one vessel under conditions for inducing precipitation and growth of aluminum trihydroxide particles from the liquor, the particles thus precipitated and grown being carried from said second circuit in said recombined stream.

2. A process according to claim 1, further including the steps of (g) beyond said second circuit, separating aluminum trihydroxide particles from the recombined stream into a coarse particle size portion and a fine particle size portion;

(h) dividing a second incoming stream of the pregnant liquor into a major portion and a minor portion;

(i) adding to only said minor portion of said second stream a first quantity of the coarse portion from step (g) as seed for inducing precipitation of aluminum trihydroxide;

(j) passing only said minor portion of said second stream, containing said first quantity of seed, through a third reaction circuit comprising at least one vessel under conditions for generating aluminum trihydroxide particles by precipitation from the liquor, the particles thus generated being carried from the third circuit in said minor portion of the second stream;

(k) beyond said third circuit, reuniting said minor portion of said second stream with said major portion of said second stream to provide a recombined second stream;

(l) adding to said recombined second stream a second quantity of said coarse portion from step (g) as seed for inducing precipitation of aluminum trihydroxide;

(m) passing the recombined second stream, containing said second quantity of seed, through a fourth reaction circuit comprising at least one vessel under conditions for inducing precipitation and growth of aluminum trihydroxide particles from the liquor, the particles thus precipitated and grown being carried from said fourth circuit in said recombined second stream;

(n) beyond said fourth circuit, separating aluminum trihydroxide particles from the recombined second stream as three discrete moieties of, respectively, coarse size particles, intermediate size particles, and fine particles, whereof said fine particles are combined with the fine portion from step (g) and used as said first seed fraction in step (b), said intermediate particles are used as said second seed fraction in step (e), and said coarse particles are recovered as the product of the process.

3. A process according to claim 1, wherein said first circuit comprises a first succession of vessels; wherein said second circuit comprises a second succession of vessels; wherein step (b) comprises adding about 20 to about 100 grams/liter of fine aluminum trihydroxide seed to said minor portion, said fine seed having a median particle size of between about 30 and about 50 microns; and wherein step (e) comprises adding to the recombined stream between about 150 and about 600 grams/liter of coarse aluminum hydroxide seed having a median particle size of between about 80 and about 100 microns.

4. An improved process for precipitating aluminum trihydroxide from Bayer process liquors, which comprises:

providing a reaction circuit having a first series of vessels for carrying out an agglomeration stage of the Bayer process and a second series of larger vessels for carrying out a growth stage of said Bayer process;

dividing an incoming stream of pregnant liquor into a minor portion and a remaining portion said minor portion being not more than 25% by volume of said incoming stream;

directing said minor portion into said first series of vessels;

adding about 20 to about 100 grams/liter of fine aluminum hydroxide seed to said minor portion, said fine seed having a median particle size of between about 30 and about 60 microns to form an agglomeration stream;

allowing said agglomeration stream to partially decompose to form a slurry of alumina particles in a solution;

directing said remaining portion of said pregnant liquor to said second set of vessels, said remaining portion having added thereto between about 150 and about 600 grams/liter of coarse aluminum hydroxide seed, said coarse seed having a median particle size of between about 80 and about 100 microns; and adding said slurry to said remaining portion in said second set of vessels in order to increase the production of coarse, strong alumina product.

5. A process in accordance with claim 4 wherein said minor portion of said stream is about 10 to about 25% of said incoming stream.

6. A process in accordance with claim 4 wherein said fine seed has a median particle size of about 35 to about 50 microns.

7. A process in accordance with claim 6 wherein said fine seed has a median particle size of about 45 microns.

8. A process in accordance with claim 6 wherein said coarse seed has a median particle size of about 80 to about 100 microns.

9. A process in accordance with claim 8 wherein said coarse seed has a median particle size of about 90 microns.

10. A method in accordance with claim 8 wherein said coarse seed is added to said second stream as a filtered moist hydrate.

11. A process in accordance with claim 10 wherein said remaining portion of said stream is subjected to cooling prior to adding the minor portion of said stream.

12. A process in accordance with claim 11 wherein said remaining portion of said stream is cooled to approximately 65° C.

13. A process in accordance with claim 11 wherein said agglomeration stream is combined with said remaining part of said stream in a first one of said second set of vessels to form a combined stream.

14. A process in accordance with claim 13 wherein said combined stream is subjected to cooling while said combined stream is in said second set of vessels.

15. A process in accordance with claim 14 wherein the temperature of the said combined stream in a last one of said second set of vessels is about 55° C. or less.

16. A process in accordance with claim 15 wherein the mean residence time in said first series of vessels is about 4 to 12 hours.

17. A process in accordance with claim 16 wherein the residence time in said second series of vessels is about 35 to 60 hours.

18. In a process for precipitating aluminum trihydroxide from Bayer process pregnant liquor, the steps of
   (a) dividing a first incoming stream of the pregnant liquor into a major portion and a minor portion;
   (b) adding to only said minor portion a first particle size fraction of aluminum trihydroxide particles as seed for inducing precipitation of aluminum trihydroxide;
   (c) passing only said minor portion, containing said first seed fraction, through a first reaction circuit comprising at least one vessel under conditions for inducing precipitation and agglomeration of aluminum trihydroxide particles from the liquor, the particles thus precipitated and agglomerated being carried from the first circuit in said minor portion of the stream;
   (d) beyond said first circuit, reuniting said minor portion with said major portion to provide a recombined stream;
   (e) adding to said recombined stream a second particle size fraction of aluminum trihydroxide particles as seed for inducing precipitation of aluminum trihydroxide, said second seed fraction being larger than said first seed fraction in median particle size;
   (f) passing the recombined stream, containing said second seed fraction, through a second reaction circuit comprising at least one vessel under conditions for inducing precipitation and growth of aluminum trihydroxide particles from the liquor, the particles thus precipitated and grown being carried from said second circuit in said recombined stream;
   (g) beyond said second circuit, separating aluminum trihydroxide particles from the recombined stream into a coarse particle size portion and a fine particle size portion;
   (h) dividing a second incoming stream of the pregnant liquor into a major portion and a minor portion;
   (i) adding to only said minor portion of said second stream a first quantity of the coarse portion from step (g) as seed for inducing precipitation of aluminum trihydroxide;
   (j) passing only said minor portion of said second stream, containing said first quantity of seed, through a third reaction circuit comprising at least one vessel under conditions for generating aluminum trihydroxide particles by precipitation from the liquor, the particles thus generated being carried from the third circuit in said minor portion of the second stream;
   (k) beyond said third circuit, reuniting said minor portion of said second stream with said major portion of said second stream to provide a recombined second stream;
   (l) adding to said recombined second stream a second quantity of said coarse portion from step (g) as seed for inducing precipitation of aluminum trihydroxide;
   (m) passing the recombined second stream, containing said second quantity of seed, through a fourth reaction circuit comprising at least one vessel under conditions for inducing precipitation and growth of aluminum trihydroxide particles from the liquor, the particles thus precipitated and grown being carried from said fourth circuit in said recombined second stream;
   (n) beyond said fourth circuit, separating aluminum trihydroxide particles from the recombined second stream as three discrete moieties of, respectively, coarse size particles, intermediate size particles, and fine particles, whereof said fine particles are combined with the fine portion from step (g) and used as said first seed fraction in step (b), said intermediate particles are used as said second seed fraction in step (e), and said coarse particles are recovered as the product of the process.

* * * * *